United States Patent [19]

Neubauer et al.

[11] Patent Number: 5,033,870
[45] Date of Patent: Jul. 23, 1991

[54] LINEAR GUIDE

[75] Inventors: Gerhard Neubauer, Königsberg; Manfred Binder, Schweinfurt, both of Fed. Rep. of Germany

[73] Assignee: Deutsche Star GmbH, Schweinfurt, Fed. Rep. of Germany

[21] Appl. No.: 580,194

[22] Filed: Sep. 10, 1990

[30] Foreign Application Priority Data

Sep. 20, 1989 [DE] Fed. Rep. of Germany ....... 3931396

[51] Int. Cl.⁵ ............................................ F16C 29/06
[52] U.S. Cl. ........................................ 384/45; 384/41
[58] Field of Search .................... 384/45, 41, 43, 44; 464/168

[56] References Cited

U.S. PATENT DOCUMENTS

| 3,044,104 | 7/1962 | Walz | 16/87.6 |
| 4,743,124 | 5/1988 | Blaurock | 384/45 |
| 4,832,508 | 5/1989 | Teramachi | 384/45 |
| 4,925,320 | 5/1990 | Foster et al. | 384/41 |

FOREIGN PATENT DOCUMENTS 3313128 10/1984 Fed. Rep. of Germany .
3527886 4/1987 Fed. Rep. of Germany .

OTHER PUBLICATIONS

Sketch of "I" Shaped Member provided by German Patent Office in prosecution of priority document, (no date).

Primary Examiner—Lenard A. Footland
Attorney, Agent, or Firm—Brumbaugh, Graves, Donohue & Raymond

[57] ABSTRACT

A linear guide comprises a guide rail and a U-shaped slide overlapping the guide rail in a carrier-like manner. The slide is guided on the guide rail by ball circuits. Recesses in the guide rail are provided which allow placing of the slide on the guide rail and removal of the slide from the guide rail in a direction perpendicular to the longitudinal axis of the guide rail.

8 Claims, 4 Drawing Sheets

LINEAR GUIDE

BACKGROUND OF THE INVENTION

The invention relates to a linear guide comprising a guide rail with a base, side faces and a top surface, a slide with a web part crossing the top surface and legs opposite to the side faces, and guiding means between the slide and the guide rail. The guiding means comprise at least one circuit of rolling elements. A load-transmitting rolling element row of this circuit is located between a load-receiving track of one side face and a load-receiving track of one of the legs. Between the load-transmitting rolling element row and the top surface, the side face of the guide rail has a profiled layer which overlaps the load-transmitting rolling element row and which prevents removal of the slide from the guide rail.

Linear guides of the above described type are known but it is disadvantageous that the slides have to be slipped onto the guide rail at one end. This is possible only when the slide already has been adjusted in true alignment with the respective guide rail.

The alignment is difficult, especially when the slide or rather an attaching part connected on it, is heavy, and in particular when several slides are bolted to one table. In this case there is the danger of misalignment. In the case of such a misalignment a retainer securing the rolling elements in the slide can be damaged or a rolling element can be pushed out of this retainer with the consequence that the course of the rolling elements is disturbed, the working life reduced, and possibly the slide is out of working order. The slides are frequently provided with sealing lips which are supposed to protect the gaps, accomodating the rolling elements between the slide and the guide rail, from the ingress of dirt. In this case there is furthermore the danger of distortion of the sealing lips on assembly with the consequence that dirt can then pass through the sealing lips. The conventional mounting of the slide is particularly difficult when in the guiding means and especially in the load-transmitting path a preload is to be provided, as it is often the case to obtain a bearing free from play and with high rigidty. The assembly is made extremele difficult, in particular when this preload is supposed to be placed through the mounting of the slide on the guide rail with a corresponding dimensioning of the distance of the slide ways and the rolling elements.

STATEMENT OF THE PRIOR ART

An embodiment of a linear guide proved in practical use is known from German Lay-Open Print No. 35 27 886 and from U.S. Pat. No. 4,743,124. For further details of a linear guide it is expressly referred to this document, and in particular to FIGS. 2e, 3, and 4 thereof. In this known embodiment the load-transmitting rolling element rows of two ball circuits are preferably disposed on above the other on each of the legs of the slide. These rolling element rows in this case are in engagement with tracks of the guide rail which are disposed at the defining flanks on the sides of a profiled recess. The profiled layer obstructing removal and insertion in this case is formed of a material layer extending over the depth of immersion of the balls between a track of the rail near the top surface and the top surface.

From German Lay-Open Print No. 33 13 128 is known a slide which can be mounted on the guide rail from above in a disassembled state. Then, roll body insets are inserted in the slide from the front. The disadvantage of this is that at least one roll body inset has to be inserted with high pressure, as there should be no play between the roll body insets of the guide rail and the slide.

OBJECT OF THE INVENTION

The invention is based on the problem of developing a linear guide of the afore-described type in such a manner that the slide can be mounted on the guide rail in a simplified way, in particular even when a preload is desired in the region of the load-bearing rolling element rows.

SUMMARY OF THE INVENTION

A linear guide comprises a guide rail with a base face, side faces, and a top surface, a slide with a web part crossing the top surface, and legs opposite the side faces. Guiding means are provided between the slide and the guide rail. The guiding means comprise at least one circuit of rolling elements. This circuit has a load-transmitting rolling element row located between a load receiving track of a side face and a load receiving track of a leg. The load transmitting rolling element row is retained in engagement with the load receiving track of the leg. At this side face and between the load-transmitting roller element row and the top surface, there is a profiled layer which overlaps the load-transmitting roller element row and prevents removal of the slide from the guide rail. In a longitudinal section of the rail length the profiled layer is omitted or recessed in such a manner that with registereing of the slide with this longitudinal section, the slide can be removed from the guide rail or placed on the guide rail. The guiding means are constructed in such a manner that with such placing of the slide on the guide rail, the load transmitting rolling element row comes into axial alignment with the load receiving track of the guide rail.

The principle of the invention can be applied in particular when the load-receiving track of the guide rail is disposed at a defining flank of the profiled layer which faces the base.

When the principle of this invention is used for a guide construction as is known from German Lay-Open print No. 35 27 886 and U.S. Pat. No. 47 43 124, the result is that the load-transmitting rolling element rows of the two roll body circuits are disposed on top of one another at one of the legs, that the side face has a profiled recess which is defined by the profile layer towards the top surface and that the load-receiving tracks of the guide rail which accompany the two load-transmitting roll body rows are developed in respective defining flanks of the profile recess which are near to the base face and to the top surface, respectively.

The proposal according to the present invention is applicable in particular when the guiding means between the guide rail and the slide are altogether formed by roll body circuits, for example when at least one pair of load-transmitting rolling element rows is disposed symmetrically on both sides of a longitudinal plane of symmetry of the rail which is situated vertically of the base.

In principle, substantial advantages are already achieved when at one end of the rail the profiled layer is recessed only over a part of the length of a respective load-bearing rolling element row. It is, however, preferable that the profiled layer is recessed over a longitudinal section of the length of the rail whose length corresponds to at least the length of the slide.

Generally, a particular guiding length of the slide is determined by the application. Corresponding to the length of this guiding path, the length of the guide rail is chosen. With the application of the invention, the length of the guide rail may be enlarged by the length of the range to be recessed and the recessed range can be provided at one end of the rail.

When the slide is to be mounted on the rail with a preload on the respective load-transmitting rolling element rows, there are several possible solutions depending on the geometry chosen for the guide rail and the slide. An advantageous solution—for such cases in which a load-receiving track of the guide rail is provided on the profiled layer—consists in that this track has a sloped entrance for the respective load-transmitting rolling elements adjacent the longitudinal section of omission.

In the case in which a fundamental configuration is used, as shown in FIG. 2e of German Lay-Open Print No. 35 27 886, the problem of the preload can be tackled in that the preload in the roll body paths near the base is produced through pressure on the slide in the vertical direction to the base and the top surface. The roll body paths near the base then enter the corresponding paths of the rails with an inclination of the legs. Then, when inserting the slide in the non-recessed region, merely a preload has to be produced which is effective in the respective upper roll body paths.

In particular, the invention can be used when several slides are to be mounted on a guide rail or several sets of slides on a coresponding number of guide rails, for instance when a machine tool table is to be guided by several sets of slides which are in alignment with one another or are provided on a plurality of guide rails, in particular two guide rails.

SHORT DESCRIPTION OF THE DRAWINGS

The accompanying drawings explain the invention in a diagram with reference to examples of the embodiments. In the drawings.

DETAILED DESCRIPTION OF THE PREFERRED EMBODIMENTS

Below only the features will be described which are essential for the essence of the inventive concept. As to further details, German Lay-Open Print No. 35 27 886 and U.S. Pat. No. 4,743,124 may be referred to.

Figure 1:
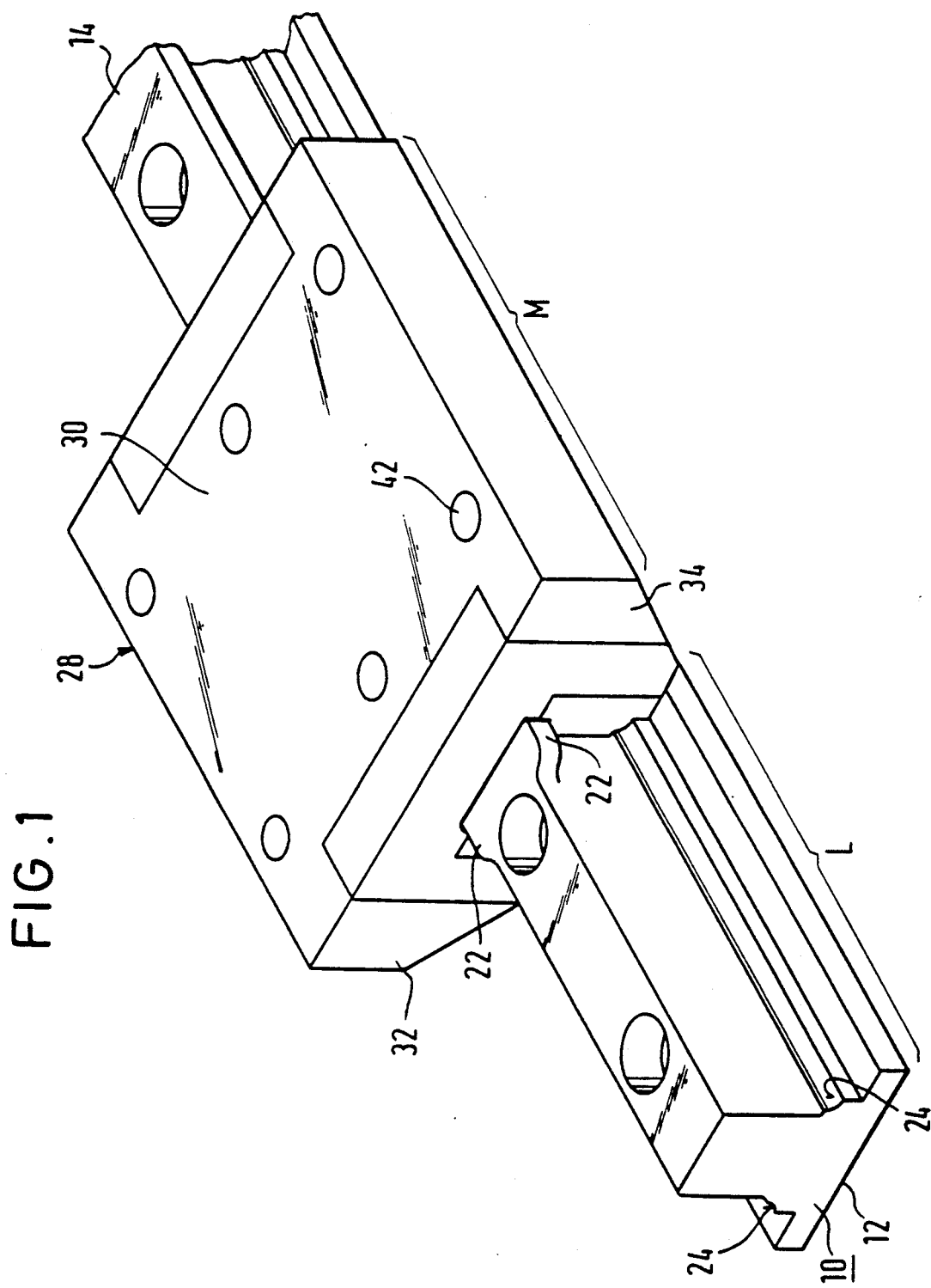
FIG. 1 is a perspective view of a linear guide according to the invention.
Figure 2:
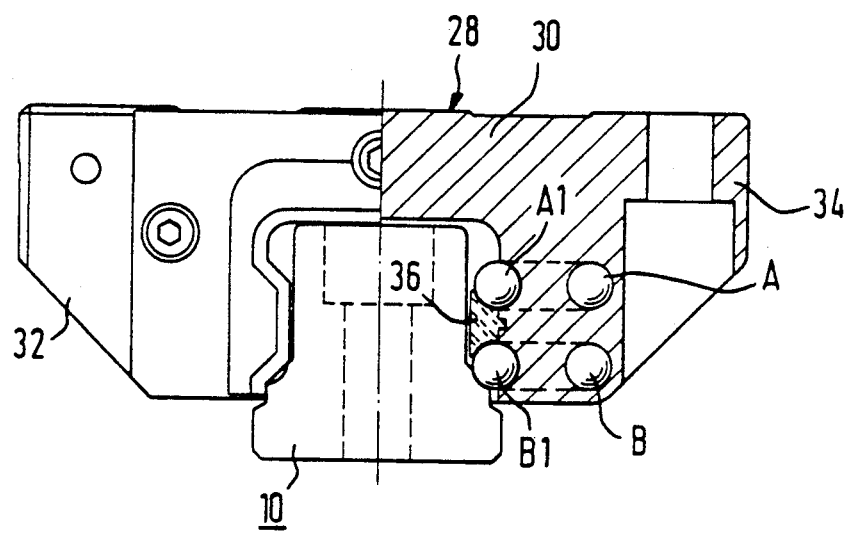
FIG. 2 is a front part-sectional view of the guide shown in FIG. 1.
Figure 3:
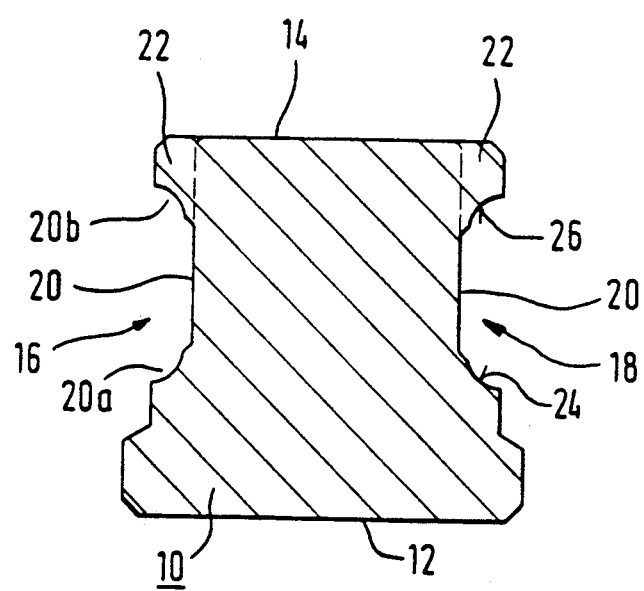
FIG. 3 is a sectional view of the guide rail.

In FIG. 1, a guide rail is generally designated 10. The rail 10 comprises a base face 12, a top surface 14, and side faces 16 and 18, which can be seen in particular in FIG. 3. In the side faces 16 and 18 profiled recesses 20 are provided which each are defined by a flank 20$b$ adjacent the top surface 14 and by a flank 20$a$ adjacent the base 12. The flank 20$b$ is allocated to a profiled layer 22 in this case which extends between the defining flank 20$b$ and the top surface 14. A load-receiving track 24 is provided by the defining flank 20$a$ and a load-receiving track 26 by the defining flank 20$b$. The slide is designated 28. It has a web 30 and two side legs 32, 34. Two rolling body circuits A and B are allocated to each of the legs 32, 34, of which each circuit A, B has a load-transmitting row of balls A1 and B2, respectively. The balls of row A1 engage with the track 26 and the balls of row B1 engage with the track 24. The rows of balls A1 and B1 are secured on the respective legs 32, 34 by retaining webs 36.

As can be seen from FIG. 1, the profiled layers 22 are omitted in longitudinal regions L at the ends of the guide rail 10 so that in each of these longitudinal regions L each preferably corresponding to the length M of the slide 28, the slide 28 can be superimposed on the guide rail 10 from above. When placing the slide 28 on the rail 10, the lower load-transmitting row of balls B1 inevitably engage on the tracks 24 with a possible preload being obtained by a certain spreading of the legs 32 and 34. When the load-transmitting rows of balls B1 are in complete engagement with the tracks 24, the slide 28 can be moved from section L of FIG. 1 to the right in its position shown in FIG. 1. Sloped entrance zones can be developed at the beginning of the profile layers 22 which facilitate the entering of the load-transmitting ball rows A1 in the tracks 26.

Figure 4:
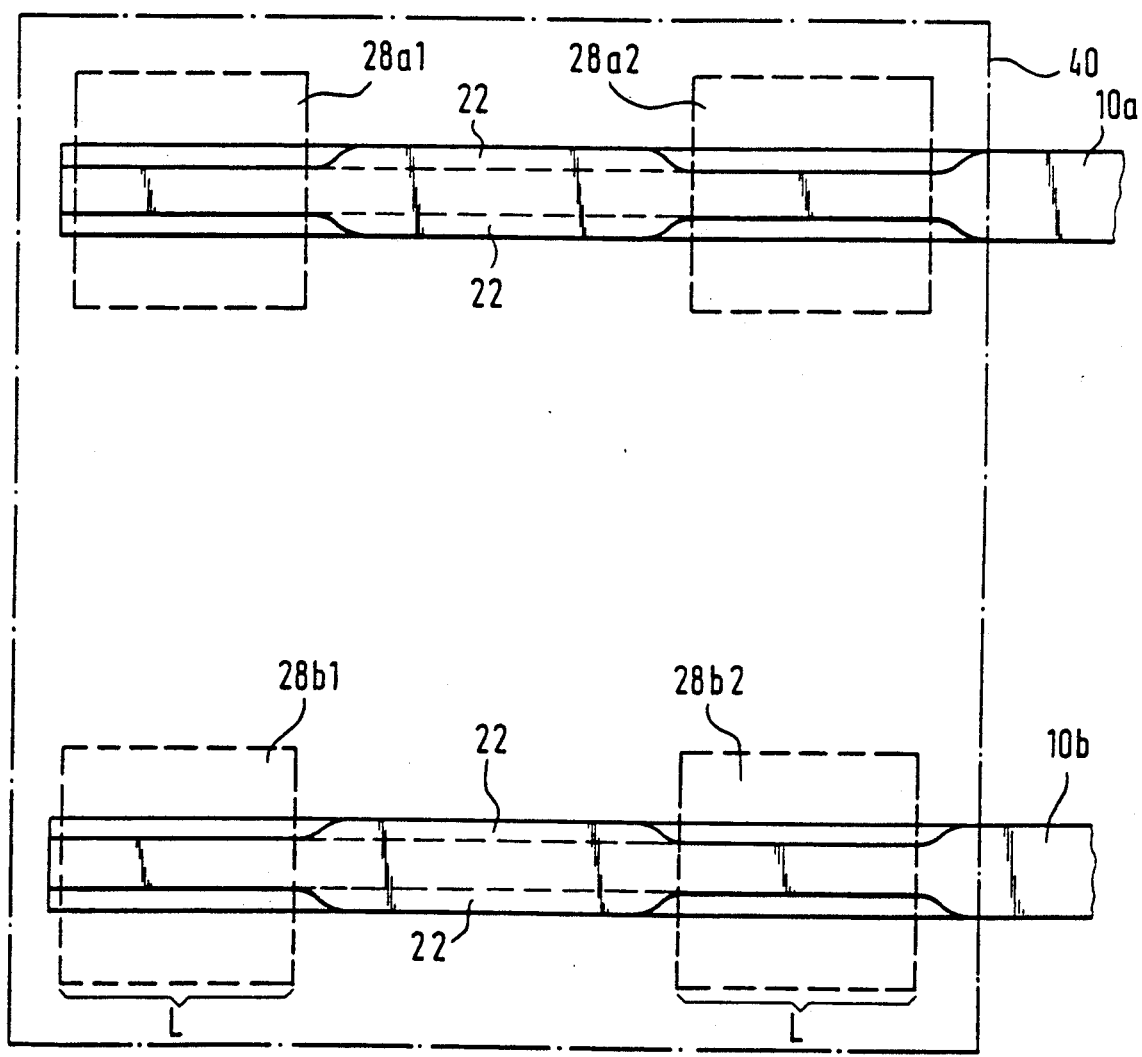
FIG. 4 is a plan view of a machine tool table guided in linear guides according to the invention.

In FIG. 4, a machine table 40 can be seen on two guide rails 10$a$ and 10$b$. The machine table 40 is connected to slides 28$a$1 and 28$a$2 and 28$b$1 and 28$b$2, respectively, and conveniently with bolts engaged in bores 42 (FIG. 1). The guide rails 10$a$, 10$b$, each have two longitudinal regions L where the profiled layers 22 are missing. The length of the longitudinal regions L is selected to correspond to the length of the slides 28$a$1, 28$a$2, 28$b$1, 28$b$2, so that the machine tool table 40 can be placed on both rails 10$a$ and 10$b$ at the same time.

With the aid of the arrangement according to FIG. 4, it is possible to exchange complete guide tables quickly. During a working cycle on a machine tool, a table which is not in action can be provided, for example, with a further workpiece and after finishing the work on one workpiece mounted on a different table, the two tables with the workpieces can be exchanged. The exchange in this case can be made of course by means of a crane or hoist.

Figure 5:
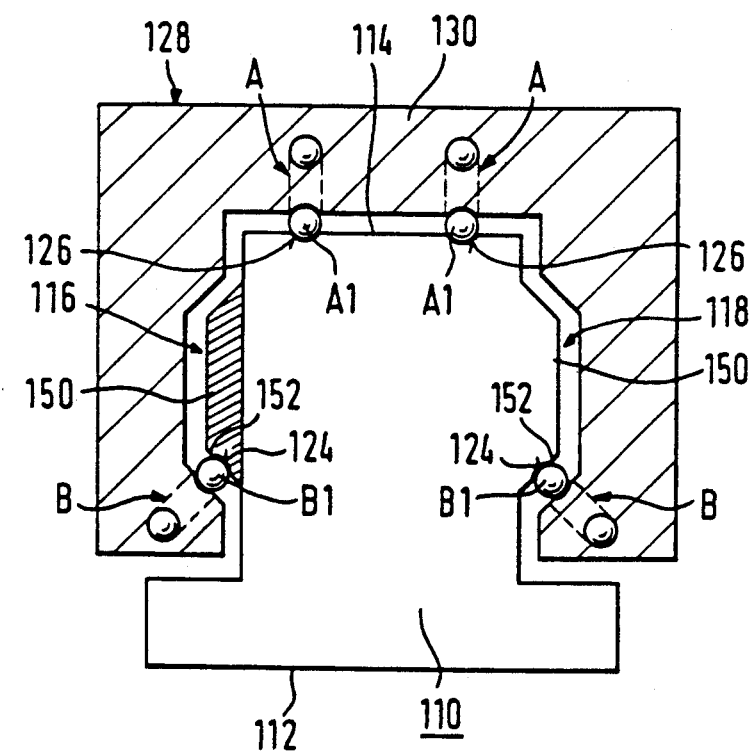
FIG. 5 is a part-sectional view of a further embodiment of a guide according to the invention.

FIG. 5 shows a further embodiment in which similar parts are provided with the same reference numerals as in FIGS. 1 to 4, but each incrased by 100. In this embodiment, profiled projections or ribs 150 are provided on the side faces 116, 118, of the rail 100. The ribs 150 have lower defining flanks 152 with load-receiving tracks 124. The slide 18 is additionally guided on the top surface 114 of the rail by rolling body circuits A accomodated in the web 130. It can be appreciated that in the case of this embodiment, the removal and superimposing of the slide 128 can be realized in that the profiled layers 150 again are omitted over the length of the load-transmitting ball rows B1. If the slide 128 with its load-transmitting ball rows A1 is placed in the tracks 126 of the top surface 114, then, the load-transmitting ball rows B1 inevitably will get into alignment with the tracks 124 of the profiled ribs 150.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A linear guide comprising a guide rail-(10) with a base face (12), side faces (16, 18), and a top surface (14), a slide (28) with a web part (30) crossing the top surface (14), and legs (32, 34) opposite the side faces (16, 18), and guiding means (A, B) between the slide (28 and the guide rail (10), the guiding means (A, B) including at least one circuit (A, B) of rolling elements, a load-transmitting rolling element row (A1, B1) of said at least one circuit (A, B) being located between a load receiving track (24, 26) of a side face (16, 18) and a load receiving track of a leg (32, 34), said load transmitting rolling element row(A1, B1) being secured in engagement with said load receiving track of said leg (32, 34), a profiled layer (22) being provided at said side face (16, 18) between said load-transmitting rolling element row (A1, B1) and the top surface (14), which profiled layer (22) overlaps the load-transmitting roller element row (A1, B1) and prevents removal of the slide (28) from the guide rail (10), said profiled layer (22) being omitted in a longitudinal section (L) of the rail length to such an extent that when the slide (28) is in registry with this longitudinal section (L), the slide (28) can be removed from the guide rail (10) or can be placed on the guide rail (10), said guiding means being constructed so that when the slide (28) is placed on the guide rail (10), the load transmitting rolling element row (A1, B1) come into axial alignment with the load receiving track (24, 26) of the guide rail (10).

2. The linear guide according to claim 1 characterized in that the load-receiving track (26; 124) of the guide rail (10; 110) is disposed at a defining flank (20b; 152) of the profiled layer (22; 150) which is directed toward the base face (12; 112).

3. The linear guide according to claim 1 characterized in that the load-transmitting rolling element rows (A1, B1) of two circuits (A, B) are disposed one above the other at one of the legs (32, 34), that the side face (16, 18) has a profile recess (20) which is defined by the profiled layer (22) toward the top surface (14), and that the respective load-recieving tracks (24, 26) of the guide rail (10) are provided in respective flanks (20a, 20b) of the profiled recess (20) which are near the base and the top surface, respectively.

4. The linear guide according to claim 1 characterized in that at least one pair of load-transmitting rolling element rows (A1, B1) are disposed symmetrically on both slides of a longitudinal plane of symmetry of the rail (10) which is disposed vertically of the base face (12).

5. The linear guide according to claim 1 characterized in that the profiled layer (22) is omitted over a longitudinal section (L) of the length of the rail, whose length corresponds to at least the length (M) of the slide (28).

6. The linear guide according to claim 1 characterized in that the longitudinal section (L) is provided near one end of the rail.

7. The linear guide according to claim 1 characterized in that the load-receiving track (26) of the guide rail (10) is provided by the profiled layer (22), and that this load-receiving track (26) has a sloped entrance zone for the respective load-transmitting rolling element row (A1, B1) at an end of said longitudinal section (L).

8. The linear guide according to claim 1 characterized in that with the allocation of two or more slides (28a1, 28a2, 28b1, 28b2) to a guide rail (10a, 10b), the profiled layer (22) of the guide rail (10a, 10b) is omitted at several places whose distance is selected corresponding to the distance of the slides (28a1, 28a2, 28b1, 28b2) in the longitudinal direction of the rail.

* * * * *